P. HASTER.
DEVICE FOR SUPPORTING AND ADJUSTING THE CONCAVE OF A GRAIN THRESHER.
APPLICATION FILED MAR. 25, 1908.

908,258.

Patented Dec. 29, 1908.

2 SHEETS—SHEET 1.

WITNESSES
G. Robert Thomas
Wm. P. Patton

INVENTOR
Peter Haster
BY Munn & Co
ATTORNEYS

P. HASTER.
DEVICE FOR SUPPORTING AND ADJUSTING THE CONCAVE OF A GRAIN THRESHER.
APPLICATION FILED MAR. 25, 1908.
908,258.
Patented Dec. 29, 1908.
2 SHEETS—SHEET 2.
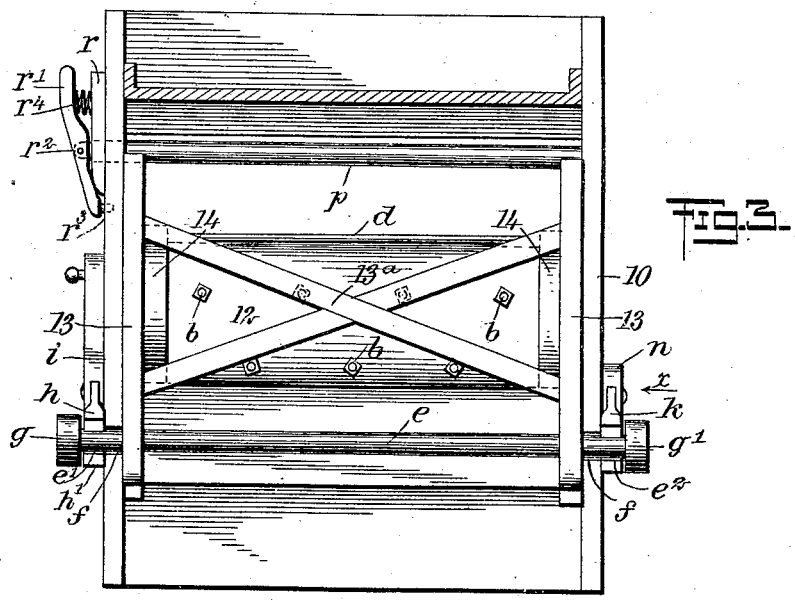
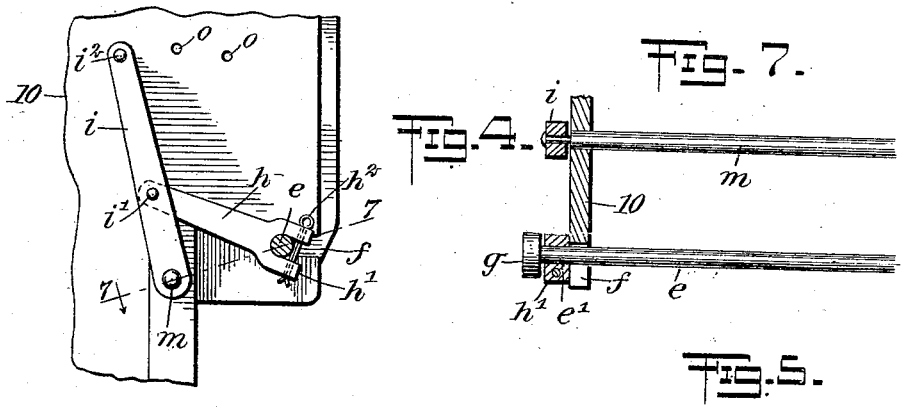
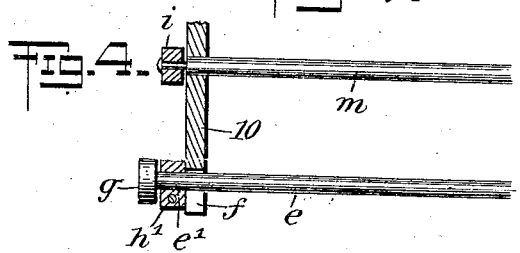
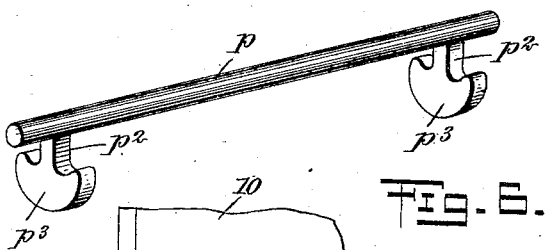
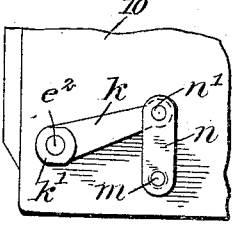
WITNESSES
G. Robert Thomas
Wm. P. Patton
INVENTOR
Peter Haster
BY
Munn & Co
ATTORNEYS

UNITED STATES PATENT OFFICE.

PETER HASTER, OF EL PASO, WISCONSIN.

DEVICE FOR SUPPORTING AND ADJUSTING THE CONCAVE OF A GRAIN-THRESHER.

No. 908,258.　　　　　Specification of Letters Patent.　　　Patented Dec. 29, 1908.

Application filed March 25, 1908. Serial No. 423,274.

*To all whom it may concern:*

Be it known that I, PETER HASTER, a citizen of the United States, and a resident of El Paso, in the county of Pierce and State of Wisconsin, have invented a new and Improved Device for Supporting and Adjusting the Concave of a Grain-Thresher, of which the following is a full, clear, and exact description.

In grain threshers of ordinary construction, the toothed concave thereof is secured firmly in position mainly below the cylinder of the machine, and in case of accident, requires considerable time and effort to remove the concave, for effecting necessary repairs to teeth thereon that may have become bent or broken while the thresher was in operation.

The object of this invention is to provide novel details of construction for a grain thresher, that afford inexpensive and convenient means for reliably supporting the toothed concave of the machine in a substantially upright position, in front of the toothed cylinder thereof, and enable the speedy outward rocking adjustment of the concave while the machine is running at full speed, thereby facilitating the tightening of loose teeth thereon or replacing a broken one, as occasion may require. The improved support for the concave also permits it to be rocked downward and outward from the breast of the machine, whereby free access is afforded to the cylinder for repairing or replacing broken or bent teeth thereon, and so maintains connection with the frame of the machine that the concave may be quickly rocked upward and toward the cylinder, be given any desired adjustment toward the latter and be reliably secured with but little manual effort.

The invention consists in the novel construction and combination of parts, as is hereinafter described and defined in the appended claims.

Reference is to be had to the accompanying drawings, forming a part of this specification, in which similar characters of reference indicate corresponding parts in all the views.

Figure 1:
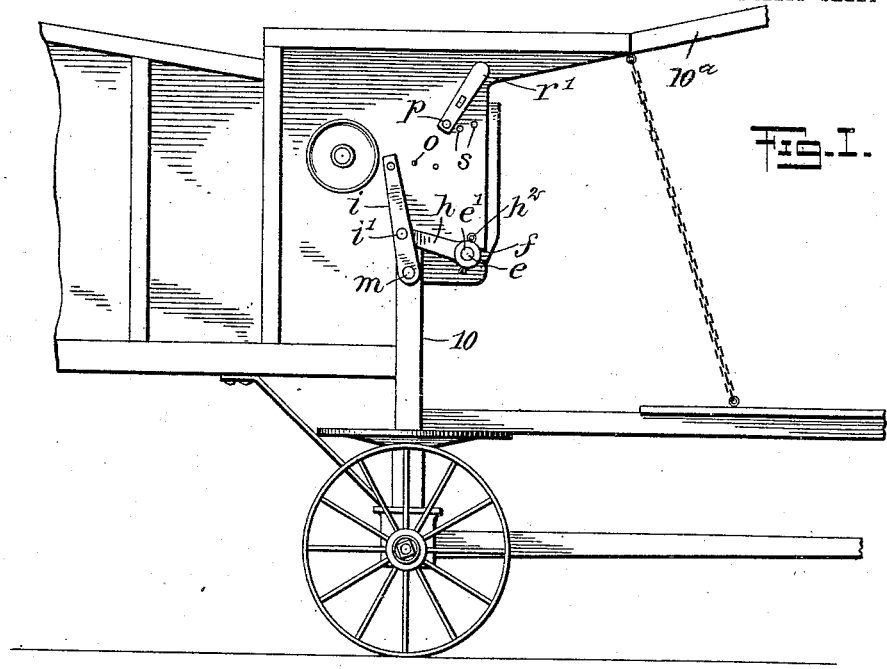
Figure 2:
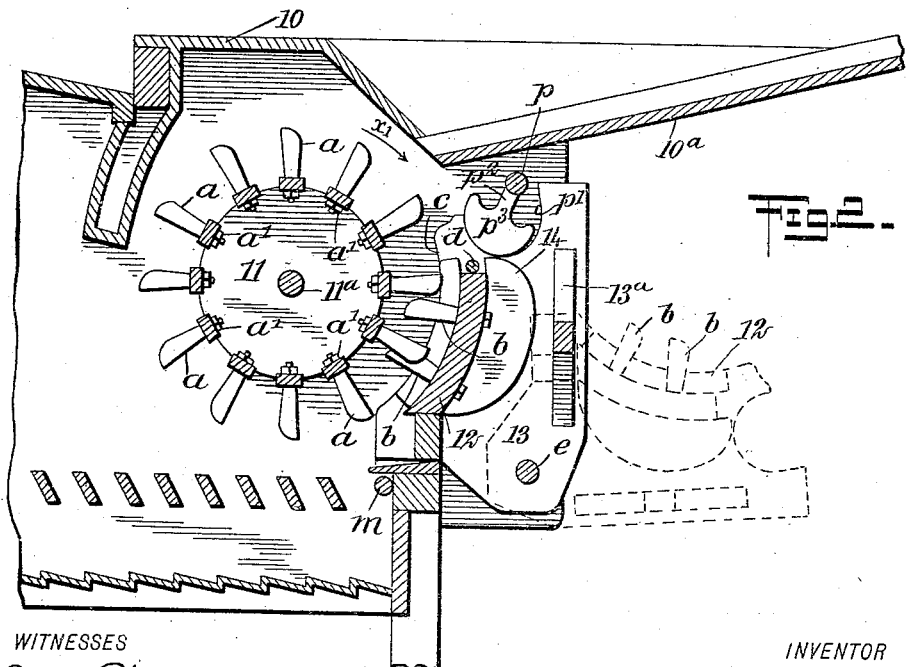

Figure 1 is a side elevational view of a thresher embodying the improvements; Fig. 2 is an enlarged sectional side view of the front portion of a grain thresher, and a transverse sectional view of details of the invention embodied therewith; Fig. 3 is a front elevational view of a threshing machine and of details of the improvement thereon; Fig. 4 is a fragmentary side view of the threshing machine frame and of novel details thereon; Fig. 5 is a detached perspective view of a rock shaft and novel arms thereon that are features of the invention; Fig. 6 is a fragmentary side view of the front portion of the thresher frame and a side view of novel details supported thereon, seen in direction of the arrow $x$ in Fig. 3, and Fig. 7 is a partly sectional plan view of details, substantially on the line 7—7 in Fig. 4.

The improvements may be combined with a grain thresher having any preferred general construction, which will permit the feeding downward of unthreshed grain sheaves between the threshing cylinder and a corresponding concave.

In the drawings, 10 represents a thresher frame adapted at its forward end for the rotatable support of the threshing cylinder 11, that may have a central shaft $11^a$, the ends of which, as usual, are journaled in suitable boxes carried on the sides of the frame 10, and as this is not a feature of the invention, the journal supports or boxes for the cylinder are omitted from the drawings.

The cylinder 11 is of ordinary form and from its cylindrical wall, radiate a plurality of teeth $a$, which are secured removably in perforations of said wall by jam nuts $a'$ or other means.

The female portion 12 of the thresher, known as the concave, is preferably constructed of a single slab of metal, that is concavo-convex in cross section, as shown clearly in Fig. 2, and from its concave surface projects a plurality of teeth $b$, preferably similar in size and form with the teeth $a$ and secured in place by any preferred means.

The improvement embodies novel details of construction for the adjustable and stable support of the concave 12, in a plane parallel with the axis of the cylinder 11, as will now be described.

Two similar bracket plates 13 are respectively secured upon the ends of the concave 12, parallel with each other, and as represented for one plate in Fig. 2, a concave edge $c$ is formed thereon, which is concentric with the shaft $11^a$ when the concave is arranged for service within the frame 10 at the front of the cylinder 11. The end portions of the concave 12, where they are affixed upon the bracket plates 13, are reinforced by an attachment of similar fillet blocks 14, which are embedded in the corners at the convex outer side of the concave and are secured thereupon, and also upon the adjacent surfaces of the bracket plates. Upon the forwardly projecting portions of the bracket plates 13, crossed brace bars 13ᵃ are secured by their ends, said brace bars serving to hold the forward edges of the bracket plates rigidly spaced apart, and thus render the concave 12 and bracket plates 13 a substantial structure. The bracket plates 13 are further reinforced and stiffened by a transversely disposed brace bar $d$, that extends between and at its ends, is secured in the bracket plates 13, at opposite points that locate the body thereof directly above the upper edge of the concave 12. The concave 12 and bracket plates thereon fit loosely between the side walls of the frame 10. A portion of each bracket plate 13 is extended downward and forward of the respective ends of the concave 12, and through the bracket plates in said lower portions thereof which are oppositely perforated, a shifting shaft $e$ is inserted and secured.

In the sides of the frame 10, near their forward lower corners, two similar slots $f$ are formed, and through said open slots, the end portions $e'$, $e^2$ of the shifting shaft $e$, are outwardly extended. Upon one end portion $e'$ of the shaft $e$, a collar or similar enlargement $g$ is removably secured, and a similar collar $g'$ is mounted upon the opposite end $e^2$ of said shaft.

One forked end $h'$ of a coupling arm $h$, is mounted loosely upon the end portion $e'$ of the shaft $e$ and thereon is detachably secured by a transversely disposed cotter pin $h^2$, as indicated in Figs. 1 and 4. From the bifurcated end $h'$, the coupling arm $h$ projects rearwardly and upwardly into a lapped engagement with the body of an upright lever $i$, between the ends of the latter, the lapped end portion of the arm $h$ being pivoted upon the lever, as indicated at $i'$ in Figs. 1 and 4.

A similar coupling arm $k$ is engaged loosely at its enlarged end $k'$ with the end $e^2$ of the shaft $e$, and thence extends rearwardly parallel with the arm $h$, having an equal length therewith.

A shaft $m$ extends transversely through the frame 10, and at one end is secured upon the lower end of the lever $i$. Upon the opposite end of the shaft $m$ is secured the lower end of an upright rock arm $n$ that, at its upper end, is pivoted upon the rear end of the coupling arm $k$, as indicated in Fig. 6, at $n'$.

It will be seen that a forwardly inclined movement of the lever $i$, will similarly incline the rock arm $n$, due to the partial rotation of the rock shaft $m$, and this will push forward the coupling arms $h$ and $k$, thus sliding the bracket plate 13 and concave 12 in a like direction at their lower portions, which will correspondingly space the lower edge of the concave from the breast of the cylinder 11. Furthermore, it will be evident that a rearward rocking movement of the lever $i$ and rock arm $n$, will draw the lower edge of the concave toward the cylinder, so that by an adjustment of the lever $i$ and arm $n$, the lower portion of the concave 12 may be exactly adjusted, as may be found advantageous in the operation of the thresher.

One means for controlling the degree of inclination given to the lever $i$ and coacting rock arm $n$, is shown in Figs. 1 and 4, consisting in the provision of a series of spaced perforations $o$, formed in the adjacent side wall of the thresher frame, these perforations being arranged in the arc of a circle that has the pivot $i'$ as a radial center.

A mating perforation is formed in the lever $i$, near its free upper end, and a pin $i^2$ may be inserted into said perforation in the lever and thence into any one of the perforations $o$ that may be caused to register with the hole in the lever, so that any desired inclination may be given to the lever $i$ and rock arm $n$, and said parts be retained as adjusted by the means hereinbefore specified.

A rock shaft $p$, is journaled near its ends in the sides of the frame 10 at a suitable distance above the bracket plates 13, and in the upper edges of the latter a semicircular concavity $p'$ is formed in each bracket plate. Upon the rock shaft $p$, over the concavities $p'$ two similar rock arms $p^2$ are mounted and secured, these arms of an equal length, having each a sector $p^3$ formed on its lower end, and as shown in Fig. 2 for one sector, the convex periphery of each one is fitted loosely into a respective concavity $p'$. The relative position of the transverse rock shaft $p$, is such with regard to that of the concavities $p'$, that the sector $p^3$ on each arm $p^2$ will be adapted to press upon the portions of the walls of the concavities nearest to the shaft, and correspondingly rock the bracket plates 13 and concave 12, having the shifting shaft $e$ as a fulcrum support. Upon one end of the rock shaft $p$, that projects through a side wall of the thresher frame 10, an upright lever $r$ is secured by its lower end, and upon the outer side of said lever, a locking arm $r'$ is rockably mounted, as is indicated at $r^2$ in Fig. 3. The locking arm $r'$ extends above and below the support $r^2$, and at the lower end thereof, is provided with a detent pin $r^3$ which may be inserted into either one of a series of spaced perforations $s$, that are formed in the adjacent side of the frame 10, by a rocking movement of the lever $r$ and locking arm $r'$; and to secure the lever and arm at a desired point of rocked adjustment, a spring $r^4$ is placed between said locking arm and lever, as shown in Fig. 3, the spring, by its expansion, serving to rock the pin $r^3$ toward and into a perforation $s$ it may be disposed opposite, as is indicated by dotted lines in Fig. 3.

It will be noted that, owing to the nearly upright position had by the concave 12, opposite and properly spaced from the breast of the cylinder 11, the grain fed into the throat above the concave and breast of the cylinder over a table 10ª or the like, will be struck by the teeth of the cylinder revolving toward the concave, as indicated by the arrow $x'$ in Fig. 2.

The forcible impact of the teeth $a$, that radiate from the cylinder 11, will be essentially in a horizontal plane that passes through the axis of the cylinder shaft 11ª, which will cause a complete separation of the chaff and grain from the straw, the grain by its gravity falling down into the lower portion of the thresher, to be winnowed by a fan, not shown, while the straw and chaff pass rearward.

It has been found in practice that there is a considerable saving of grain threshed by the improved apparatus, as this obviates largely the tendency of grain being carried away rearward along with the straw, which is an objectionable feature incidental to the employment of concaves located merely beneath the cylinder.

Among other advantages afforded by the employment of the improvements, it will be noted that upon the removal of the rock shaft $p$, the concave and the attachments thereto may be swung outward and downward, as is shown by dotted lines in Fig. 2, which will afford free access to the teeth of the concave for repair or replacing of broken teeth. It will also be seen that such a removal of the concave will permit a rotation of the cylinder to throw out broken teeth or any other small impediment to free rotation; and it will also be apparent that free access is permitted for effecting the removal of teeth in the cylinder or for tightening loose teeth, as occasion may require, and the same advantage is afforded for tightening the teeth in the concave 12, should this become necessary.

The novel construction of details connected with the concave 12, enables said concave to receive any desired adjustment with relation to the breast of the cylinder, so as to secure the most advantageous results in the threshing operation, and it will be seen that such adjustments may be quickly effected while the thresher cylinder is running at full speed.

Minor changes in constructive details may be resorted to within the scope of the invention, and I claim all such immaterial changes as fall within the scope of the claims.

Having thus described my invention, I claim as new and desire to secure by Letters Patent:

1. The combination with a thresher frame, of a cylinder rotatable therein, a concave in connection with the cylinder, a bracket plate on each end of the concave a fulcrum support for the bracket plates near their lower ends, a transverse rock shaft mounted upon the frame above the concave and arms on the said shaft having fixed lower faces, the bracket plates being provided with concavities for engagement by said faces.

2. The combination with a thresher frame, and a cylinder rotatable therein, of a concave mating the cylinder, a bracket plate on each end of the concave and parallel with each other, a fulcrum support for the bracket plates near their lower ends, the upper ends thereof having concavities therein, a transverse rock shaft mounted upon the frame over the concavities, and arms on said shaft having convex lower faces that engage the bracket plates within the concavities.

3. The combination with a thresher frame, and a cylinder rotatable therein, of a concave mating the cylinder, a bracket plate on each end of said concave, a rockable support engaging the upper edges of the bracket plates and concave, a transverse shaft secured on the lower portion of said concave and bracket plates, said shaft projecting through the sides of the frame, coupling arms on the ends of said shaft, a lever fast on one end of said shaft, a rock arm secured on the other end of the shaft, one coupling arm being pivoted on the lever at one end of said arm and the other arm pivoted at one end on the rock arm, whereby the rocking adjustment of the lever will slidably move the bracket plates and concave toward or from the cylinder.

4. The combination with the cylinder, of a concave, provided at each end with a bracket plate, a rockable support engaging the upper edges of the bracket plates and concave, a transverse shaft secured on the lower portion of the concave bracket plates, and means for rocking the shaft and means for moving the support whereby to adjust the respective edges of the concave independently toward and from the cylinder.

5. The combination with the cylinder, of a concave, a rockable support engaging the upper edge of the concave, a transverse shaft connected with the lower edge of the concave, means for moving the shaft, and means for moving the support whereby to adjust the respective edges of the concave independently toward and from the cylinder.

In testimony whereof I have signed my name to this specification in the presence of two subscribing witnesses.

PETER HASTER.

Witnesses:
  W. E. WARREN,
  ED. HALLIDAY.